W. H. NEEDHAM, D. P. COOK & E. KLAHN.
BALL BEARING.
APPLICATION FILED JAN. 14, 1911.
1,242,582.
Patented Oct. 9, 1917.
2 SHEETS—SHEET 1.
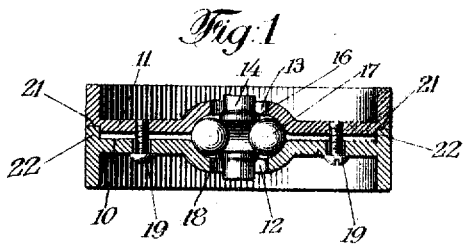
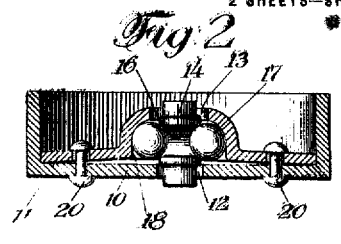
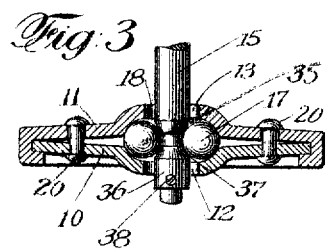
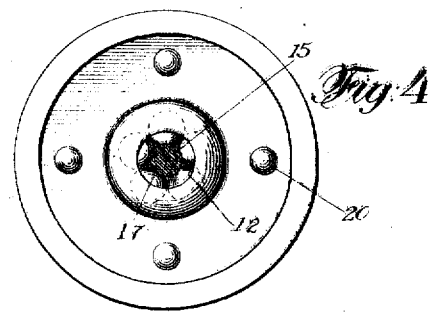
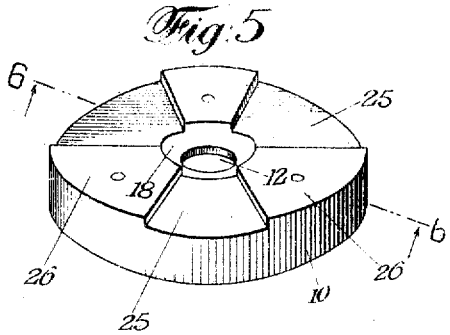
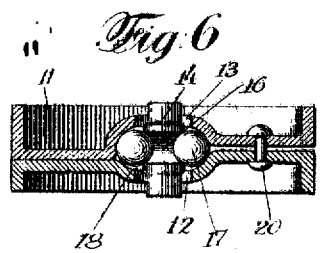
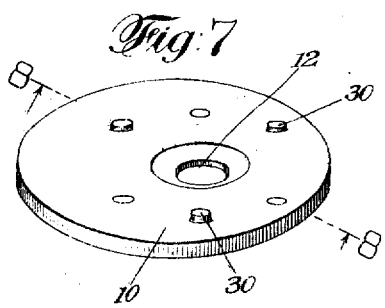
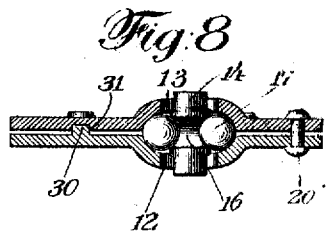
Witnesses
John E. Prager
Frank C. Holbrook
William H. Needham
Douglas P. Cook
Emil Klahn
Inventors
By Attorney
Fred P. Schuetz W. H. NEEDHAM, D. P. COOK & E. KLAHN.
BALL BEARING.
APPLICATION FILED JAN. 14, 1911.
1,242,582.
Patented Oct. 9, 1917.
2 SHEETS—SHEET 2.
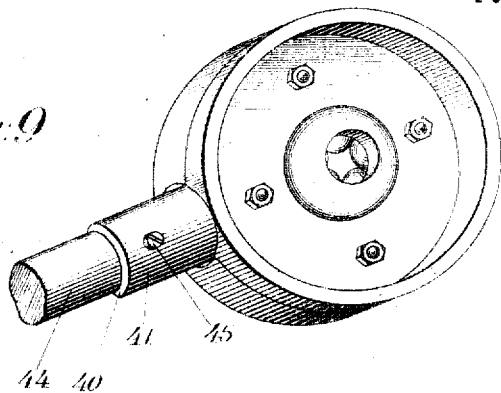
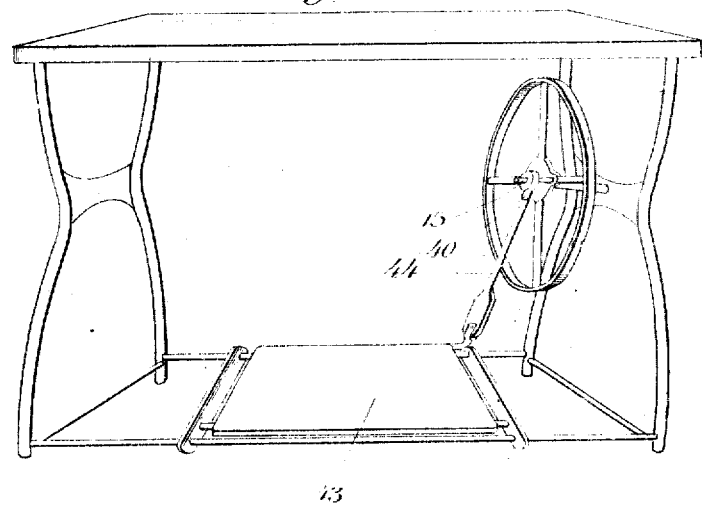

UNITED STATES PATENT OFFICE.

WILLIAM H. NEEDHAM AND DOUGLAS P. COOK, OF WORCESTER, MASSACHUSETTS, AND EMIL KLAHN, OF WEEHAWKEN HEIGHTS, NEW JERSEY.

BALL-BEARING.

1,242,582.   Specification of Letters Patent.   Patented Oct. 9, 1917.

Application filed January 14, 1911. Serial No. 602,721.

*To all whom it may concern:*

Be it known that we, WILLIAM H. NEEDHAM, DOUGLAS P. COOK, and EMIL KLAHN, citizens of the United States, and residents, respectively, of Worcester, in the county of Worcester and State of Massachusetts, of Worcester, in the county of Worcester and State of Massachusetts, and of Weehawken Heights, in the county of Hudson and State of New Jersey, have invented certain new and useful Improvements in Ball-Bearings, of which the following is a specification.

The invention relates to ball bearings, and more particularly to ball bearings employing but one set of balls which are confined within a suitable raceway provided by holding plates of the improved bearing.

It has for its object to so construct the bearing that the desired pressure may be placed upon the said balls confined within the raceway, and that the same may be adjustable; also, to so arrange the holding plates that the same may be positively centered to produce an accurate bearing. It has for its further object to provide a bearing within which the balls may be retained without employing the usual sleeve, and which bearing may be provided with a suitable attaching member.

To this end the invention consists in certain novel features of construction which are hereinafter described, and are shown in the accompanying drawings, in which—

Figure 1 is a sectional view illustrating the improved ball bearing.

Fig. 2 is a similar view illustrating a different form of the bearing.

Fig. 3 is a vertical section, and Fig. 4 a plan of a bearing in which the balls are retained without employing the usual sleeve.

Figs. 5 and 6 are respectively a plan view of the lower member of a bearing and a vertical section of the assembled bearing, illustrating a modification.

Figs. 7 and 8 are similar views illustrating another modification.

Fig. 9 is a perspective view of a bearing with balls retained without the aid of a sleeve, and provided with an extending attaching sleeve.

Fig. 10 is a vertical section of the same.

Fig. 11 is a perspective view showing an application of the said bearing provided with an attaching member.

Similar characters of reference designate corresponding parts throughout the several views.

Referring now to the drawings, 10 and 11 designate respectively the lower and the upper plates of the bearing, and are each apertured to provide registering apertures 12 and 13 through which is adapted to pass a suitable sleeve 14, Figs. 1, 2, 6 and 8, or a shaft 15, Figs. 3, 4 and 11. The sleeves 14 are grooved about their periphery to provide an annular groove or seat 16 adapted to receive a single set of balls 17. These balls are held in position in said seat by means of the plates 10 and 11 which, with the exception of the plate 10, Fig. 2, are flared outwardly around the central opening to provide a suitable annular raceway 18 for the said balls. In Fig. 2, the plate 10 is shown with its central portion unflared; the plate 11, however, is flared similarly to the corresponding plates of the various bearings shown in the other views.

The plates 10 and 11, or if desired only one of the plates, are sufficiently resilient so that the same may be yieldable relatively to each other. By maintaining these plates a slight distance apart, (shown greatly exaggerated in the drawings for the sake of clearness) it is possible to draw the said plates together to provide the desired pressure upon the balls 17. For this purpose there are provided screws 19, Figs. 1 and 10 or suitable rivets 20, Figs. 2, 3, 4, 6, and 8. The screws 19, Fig. 1, pass through the plate 10 and into the plate 11, whereby the said plates may be drawn together to obtain the desired pressure upon the balls 17; and, in case rivets are employed, the same are clenched in well-known manner. Fig. 3 illustrates a different manner of securing the two plates 10 and 11 together. The plate 11 is therein shown as turned and spun over the outer edge of the plate 10.

To maintain the plates a slight distance apart various means may be employed. For example, in Fig. 1, the plate 11 is provided at its periphery or flange with an offset 21 which is adapted to receive a projection 22 from the plate 10 and somewhat longer than the said offset 21. In Figs. 2 and 3, the plates are arranged at a slight angle to each other to maintain their inner faces apart. Figs. 5 and 6 show the plates 10 and 11 with segmental, recessed portions 25 and segmental projecting portions 26. The recessed portions 25 of the lower plate, for example, are adapted to coöperate with the corresponding projecting portions 26 of the upper plate, which projecting portions are somewhat higher than the depth of the recessed portions 25, whereby the inner faces of said upper recessed portions and of the lower projecting portions will be held a slight distance apart, as shown. In Figs. 7 and 8, the plate 10 is provided with projections 30 adapted to fit corresponding depressions 31 formed in the upper plate 11, but of a depth slightly less than the height of the said projections 30, whereby the inner faces of the said plates will be maintained a slight distance apart. The means above described in connection with Figs. 1, 5, 6, 7 and 8 provide, also, for the positive centering of the plates, so that an accurate bearing is produced. In the constructions illustrated in Figs. 2, 3 and 4, the plates 10 and 11 are centered by forcing one plate within the flanged or turned over portion of the other.

Figs. 3, 4, 9, 10 and 11 illustrate a bearing in which the flared portion of the plates 10 and 11 extends slightly beyond the center of the balls 17, so that the same are retained by the bearing itself, and no sleeve is required as in the usual form of bearing. To apply a bearing of this character, with retained balls, to a shaft, as for example to the shaft 15, Figs. 3 and 4, the said shaft may be provided with a conical shoulder 35 against which the said bearing is made to abut. The bearing is held thereto by means of a suitable collar 36 provided with conical end 37 fitting in against the balls 17 and held in place on the shaft 15 by a suitable set screw 38, or the like. In Figs. 9 to 11, the bearing is illustrated with an extending attaching sleeve or member 40 composed of two portions 41 and 42, the former extending from and being integral with the plate 10, and the latter similarly extending from the plate 11 and coöperating with the former to provide the sleeve 40. A bearing with such attaching member is suitable for use in connection with treadle mechanism, for example as shown in Fig. 11; and in which a treadle 43 is connected with the same through a connecting rod 44 held within sleeve 40 in any suitable manner, as by means of a set screw 45. The bearing in this application is simply placed over shaft 15 without any provision against lateral displacement, being held in substantially one position on the said shaft by the said treadle mechanism.

It is evident that various means may be employed to maintain the said plates a slight distance apart for the purpose set forth, as well as to center the same; and the invention is not restricted to the specific means herein set forth. The attaching means illustrated in connection with the bearing provided with the retained balls may also be varied without departing from the spirit of the invention.

We claim:—

1. A two-piece ball bearing comprising: two apertured plates, slightly yieldable relatively to each other, provided with means whereby the said plates are maintained a slight distance apart and affording an annular raceway, a single set of balls held between said plates in said raceway and substantially in contact with each other, and means between the circumference of said plates and the said set of balls to draw the former together to provide the desired pressure upon the latter.

2. A two-piece ball bearing comprising: two apertured plates, slightly yieldable relatively to each other, provided with means whereby the said plates are maintained a slight distance apart and affording an annular raceway, a single set of balls held between said plates in said raceway, and substantially in contact with each other, and adjustable means between the circumference of said plates and the said set of balls to draw the former together to provide the desired pressure upon the latter.

3. A two-piece ball bearing comprising: two apertured plates, slightly yieldable relatively to each other, provided with means whereby the said plates are maintained a slight distance apart and affording an annular raceway, a single set of balls held between said plates in said raceway and substantially in contact with each other, means between the circumference of said plates and the said set of balls to draw the former together to provide the desired pressure upon the latter, and means to positively center said plates.

4. A self-contained ball bearing comprising two apertured plates affording an annular raceway and two registering apertures, a single set of balls held between said plates in the said raceway and the bearing balls substantially in contact with each other, the distance between any two diametrically opposed balls thereof being less than the diameter of a single ball, whereby the said balls are self retained, and means to secure said plates to each other.

5. A self-contained ball bearing comprising two apertured plates affording an annular raceway and two registering apertures, a single set of balls held between said plates in said raceway and the bearing balls substantially in contact with each other, the plates extending beyond the center of the balls, and the distance between any two diametrically opposed balls thereof being less than the diameter of a single ball, whereby the said balls are self-retained, and means to secure said plates to each other.

6. A self-contained ball bearing comprising two apertured plates affording an annular raceway and two registering apertures, a single set of balls held between said plates in the said raceway and the bearing balls substantially in contact with each other, the distance between any two diametrically opposed balls thereof being less than the diameter of a single ball, whereby the said balls are self-retained, means to secure said plates to each other, and attaching means extending from said bearing.

7. A self-contained two-piece ball bearing comprising two apertured plates, slightly yieldable relatively to each other, provided with means whereby the said plates are maintained a slight distance apart and affording an annular raceway and two registering apertures; a single set of balls held between said plates in the said raceway and the bearing balls substantially in contact with each other, the distance between any two diametrically opposed balls thereof being less than the diameter of a single ball, whereby the said balls are self-retained, and means to secure said plates to each other.

8. A two-piece ball bearing comprising: two apertured plates, slightly yieldable relatively to each other and having means integral therewith to maintain said plates a slight distance apart and affording an annular raceway, a single set of balls held between said plates in said raceway, and means between the circumference of said plates and the said set of balls to draw the former together to provide the desired pressure upon the latter.

9. A two-piece ball bearing comprising: two apertured plates, slightly yieldable relatively to each other and having means integral therewith to maintain said plates a slight distance apart and affording an annular raceway, a single set of balls held between said plates in said raceway, and adjustable means between the circumference of said plates and the said set of balls to draw the former together to provide the desired pressure upon the latter.

10. A two-piece ball bearing comprising: two apertured plates, slightly yieldable relatively to each other and having means integral therewith to maintain said plates a slight distance apart and affording an annular raceway, a single set of balls held between said plates in said raceway, means between the circumference of said plates and the said set of balls to draw the former together to provide the desired pressure upon the latter, and means to positively center said plates.

Signed at Worcester, in the county of Worcester, and State of Massachusetts, this tenth day of January 1911.

WILLIAM H. NEEDHAM.
DOUGLAS P. COOK.
EMIL KLAHN.

Witnesses:
   ARTHUR S. HOUGHTON,
   GEORGE A. DRURY.